United States Patent [19]
Cort

[11] 3,790,933
[45] Feb. 5, 1974

[54] VEHICLE SECURITY SYSTEM
[76] Inventor: Arthur H. Cort, 23 Bittersweet Ln., Weston, Mass. 02193
[22] Filed: June 9, 1972
[21] Appl. No.: 261,265

[52] U.S. Cl. ............... 340/63, 307/10 AT, 180/114
[51] Int. Cl. ........................................... B60r 25/10
[58] Field of Search ............... 340/63, 64, 65, 164; 307/10 AT; 180/114

[56] References Cited
UNITED STATES PATENTS

| | | | |
|---|---|---|---|
| 3,634,880 | 1/1972 | Hawkins | 340/63 |
| 3,656,100 | 4/1972 | Beltrami | 340/63 |
| 3,698,505 | 10/1972 | Webley | 340/63 X |
| 3,665,386 | 5/1972 | Dosch | 340/63 X |

*Primary Examiner*—Alvin H. Waring

[57] ABSTRACT

A security system for use in a motor vehicle and particularly one carrying valuable cargo operates to permit normal operation of the vehicle over a predetermined time interval when a proper code has been entered into a code logic means of the system, and subsequently inhibits normal operation of the vehicle such as by locking the brakes of the vehicle after the termination of the predetermined time interval unless a second proper code, preferably different from the previously entered code, has been entered into the code logic means of the system. In a preferred embodiment of the invention the system includes a master timer defining a first time interval the length of which may be dependent upon a portion of the entered code, a warning timer responsive to the termination of the first time interval and defining a second time interval, preferably shorter than the first time interval, and an emergency timer responsive to the termination of the second time interval and operation of an emergency switch for enabling continued operation of the vehicle for a third time interval comparable to the second time interval. The system may also include an electromechanical lock located inside the cargo compartment and second code logic means responsive to entry of a second proper code for opening the lock.

8 Claims, 5 Drawing Figures

VEHICLE SECURITY SYSTEM

FIELD OF THE INVENTION

The present invention pertains in general to a security system for a motor vehicle preferably of the type that carries cargoes. More particularly, the present invention relates to a vehicle security system for a cargo vehicle that permits normal travel of the vehicle over a predetermined time interval when a proper code has been entered in the system, and subsequently inhibits further movement of the vehicle after the termination of the predetermined time interval unless a second proper code, preferably different from the previous code, has been entered.

BACKGROUND OF THE INVENTION

There are various types of security and alarm systems and devices presently in use in mor motor vehicles. Most of these systems are used to prevent the theft of the vehicle when it is left unattended. There are other types of security systems for use in vehicles or in association with vehicles that carry cargoes, that either keep track continuously of the position of the vehicle or emit an alarm signal when an unauthorized person seizes control of the vehicle. The present invention is directed to a security system of the type that prevents continued operation of a cargo-carrying vehicle when it is seized by an unauthorized person.

Because of the ever increasing number of thefts of valuable cargoes that occur even while the vehicle carrying the cargo is in transit between destinations, there is a definite need for an effective system for detering these thefts. One of the disadvantages to a tracking type of system is that once the transmitter at the vehicle is found and destroyed, the vehicle can no longer be tracked and the vehicle can be driven to virtually any destination. In another known system the vehicle is marked on top and a helicopter service is utilized to scan the intended travel path of the vehicle when it is overdue to try to detect its location. This type of a system has proven to be not completely satisfactory and, more important, is far too costly. Similarly, the use of an armed guard riding in the vehicle is also too costly.

CONCEPT OF THE INVENTION

Accordingly, the system of the present invention is contained in the vehicle and enables normal operation of the vehicle, even if it is seized by an unauthorized person, for a predetermined time interval determined by a code previously entered into the system by the authorized driver of the vehicle. At the end of this predetermined time interval the system is adapted to interrupt continued motion of the vehicle by any one or more of many means such as by breaking the engine fuel line or locking the brakes of the vehicle. Near the end of the predetermined time interval a warning signal, which may be in the form of a blinking flasher, is activated thereby indicating to the authorized person that a new code number has to be entered into the system in order to continue operation of the vehicle after termination of the predetermined time interval. The new code number is usually obtained by the vehicle operator from the dispatcher at a central control terminal via telephone. The dispatcher keeps track of the last used code and the next proper code in a master list containing many different codes which are preferably decimal codes.

If the operator of the vehicle does not have sufficient time during the warning signal interval to reach a telephone then the system is provided with an emergency switch and associated emergency timer which is operable, preferably only once, to give an additional enabling interval to the system before motion of the vehicle is interrupted, thereby allowing the authorized operator sufficient time to reach a telephone and receive the next proper code.

In the event that an unauthorized person seizes control of the vehicle he is generally unaware of any problem until the warning signal occurs. At that time there is only a relatively short time interval until the end of the predetermined time interval at which time motion of the vehicle is interrupted. Even if the unauthorized person finds and operates the emergency switch he will not be able, most probably, to continue operation to his intended destination and would therefore, most probably, abandon the vehicle which may later be located by the police or or other law enfircement officials. Also, if the unauthorized person finds the code entry switch he does not know the correct code to enter and is therefore not able to commence another predetermined time interval.

In a preferred embodiment of the invention the codes are entered via a code switch with a portion of the code being used for enabling the system for continued operation and the remaining portion defining the length of the predetermined time interval. Also, in a preferred embodiment the system includes a cancel switch and associated circuitry which inhibits emergency operation and interrupts all operating power to the system. If the authorized person suspects a theft attempt the cancel switch can be used to immediately inhibit further movement of the vehicle.

OBJECTS OF THE INVENTION

Accordingly, it is a primary object of the present invention to provide an improved vehicle security system of the type that includes a timer means and inhibits vehicle movement after the expiration of a predetermined time interval when the vehicle is operated by an unauthorized person.

Another object of the present invention is to provide a vehicle security system wherein an authorized operator may receive a proper code, preferably by telephone communication with the central terminal, to enable continued operation of the vehicle to its destination.

A further object of the present invention is to provide a vehicle security system which includes code logic means and an input code switch for entering the next proper code wherein the code logic means is conditioned to enable operation of the system only when it is the next proper code that is entered, and to not enable operation of the system when an improper code is entered.

Still another object of the present invention is to provide a vehicle security system in accordance with the preceding object and including a counter having a count visible therein which visible count may be conveyed by the operator to the dispatcher at the central terminal to indicate the next proper code to be entered into the system.

Still a further object of the present invention is to provide a vehicle security system including a timer means defining a predetermined time interval and including a warning time interval provided at the end of the predetermined interval.

Another object of the present invention is to provide a vehicle security system having an emergency timer and associated emergency switch for extending the predetermined time for a short period to enable an authorized operator to receive the next proper code.

A further object of the present invention is to provide a security system for use in a cargo-carrying vehicle comprising an inside lock disposed in the storage compartment of the vehicle wherein the system includes a code logic means and associated code switch operable only upon entry of the proper code to unlock the door of the storage compartment.

SUMMARY OF THE INVENTION

Accordingly, the vehicle security system of the present invention is adapted for use in a vehicle, preferably of the cargo-carrying type, to inhibit motion of the vehicle when operated by an unauthorized person, and generally comprises input code logic means including an input code switch for storing a predetermined proper code, a timer means having means for establishing a predetermined time interval and responsive to entry of the proper code for starting said timer means, a means for impeding motion of the vehicle, and means responsive to the termination of the predetermined time interval for enabling the means for impeding motion. In a preferred embodiment of the invention the timer means is responsive to a first portion of the proper code for defining a running time interval of the timer means and is responsive to a second portion of the proper code for commencing the time interval. Also, in a preferred embodiment the timer means comprises a master timer defining a first time interval the length of which may be a function of a portion of the proper code, a warning timer responsive to the termination of the first time interval and defining a second time interval, preferably shorter than the first time interval, and an emergency timer responsive to the termination of the second time interval and operation of an emergency switch for enabling continued operation of the vehicle for a third time interval comparable to the second time interval.

In accordance with another embodiment of the present invention the system may also include an electromechanical lock located inside the storage compartment of the vehicle, and the cab of the vehicle may include a second code logic means responsive to entry of a second proper code for enabling an opening of the inside door lock.

BRIEF DESCRIPTION OF THE DRAWINGS

Numerous other objects, features and advantages of the invention should now become apparent upon a reading of the following detailed description in conjunction with the drawings in which.

DETAILED DESCRIPTION

Figure 1:
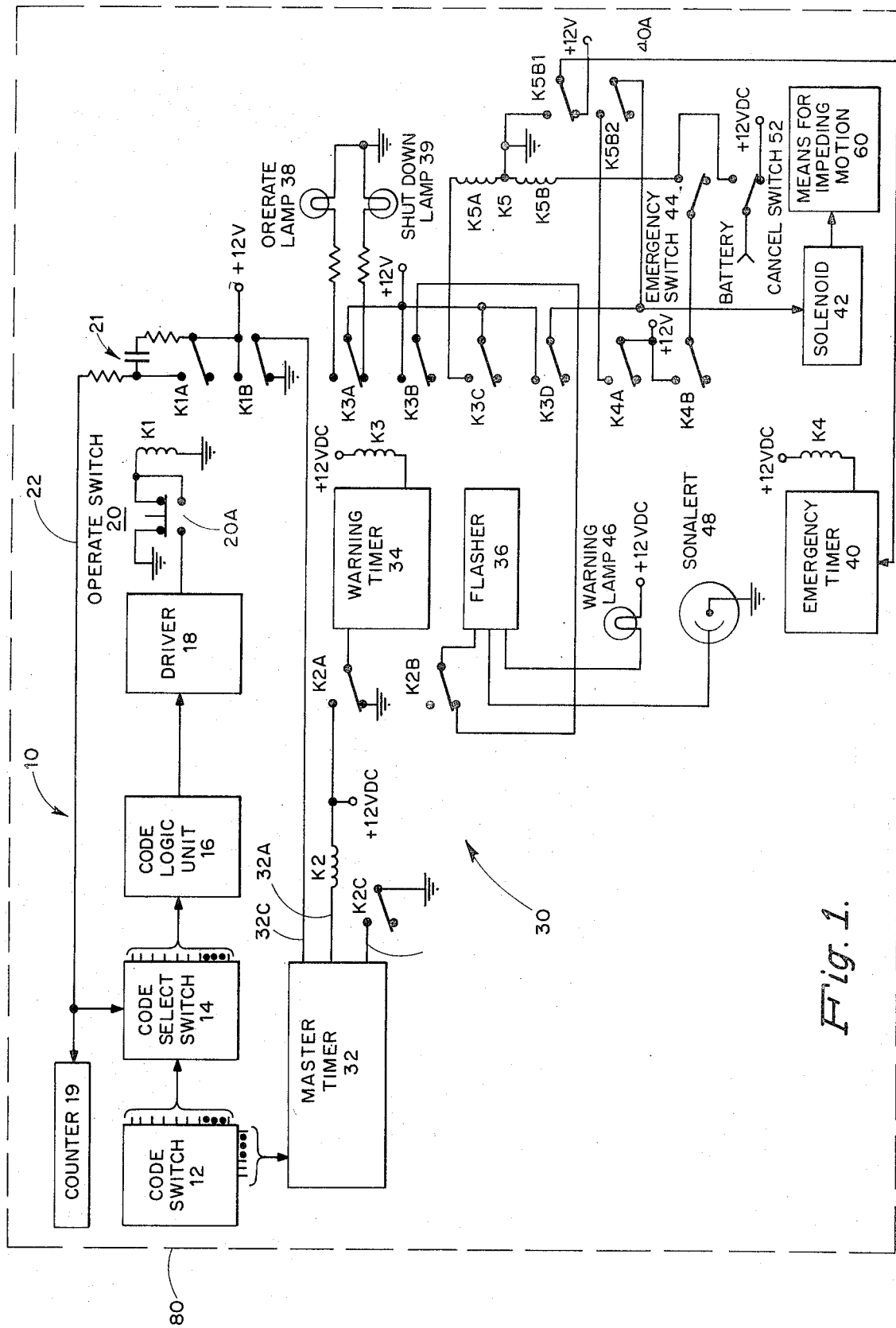
FIG. 1 is a partial block, partial circuit schematic diagram of a preferred embodiment of a vehicle security system constructed in accordance with the principles of the present invention.

Referring now to the drawings and, in particular, to the partial block diagram of FIG. 1, there is shown a preferred embodiment of the system of the present invention which, in general, comprises code logic means 10, an operating switch 20, timing means 30, and means responsive to the timing means for interrupting motion of the vehicle. In FIG. 1 this latter means is shown as means for impeding motion 60 which may include the vehicle brake or fuel system. Most of the circuitry shown in the block diagram of FIG. 1 may be contained within a single unit which is contained within the vehicle 80 and preferably in or near the driving compartment of the vehicle. The switches shown in FIG. 1 including the operate switch 20 are preferably readily accessible to the authorized operator of the vehicle but may be hidden from view.

The system shown in FIG. 1 is preferably adapted for use in a relatively large truck having sizeable cargo carrying compartment.

Referring still to FIG. 1 the code logic means 10 generally comprises a code switch 12, code select switch 14, code logic unit 16, driver 18 and counter 19. The relay contacts are shown in an unlatched position. One purpose for the code logic means 10 is to provide an enabling signal at the output of driver 18 when the proper code is inserted into code switch 12, which enabling signal is coupled by way of operate switch 20 to energize relay K1 and start the timing cycle of the system. If an improper code is entered into code switch 12 no enabling signal is provided, relay K1 will not latch upon operation of switch 20 and the vehicle will not be operable.

More particularly, the code switch 12 may be a four position switch with each position having 10 poles associated therewith and the code select switch 14 may be a stepping switch which is prewired in a particular pattern so that upon entry of a code into code switch 12 the output lines from the code switch 14 are only all enabled when the proper code has been inserted. The code logic unit 16 provides an output only when all of its input lines are enabled, which output is coupled by way of driver 18 to operate switch 20. The code select switch 14 is shown and discussed in more detail hereinafter with reference to FIG. 2. Similarly, the code logic unit 16 and driver 18 are discussed in more detail hereinafter with reference to FIG. 3.

Figure 2:
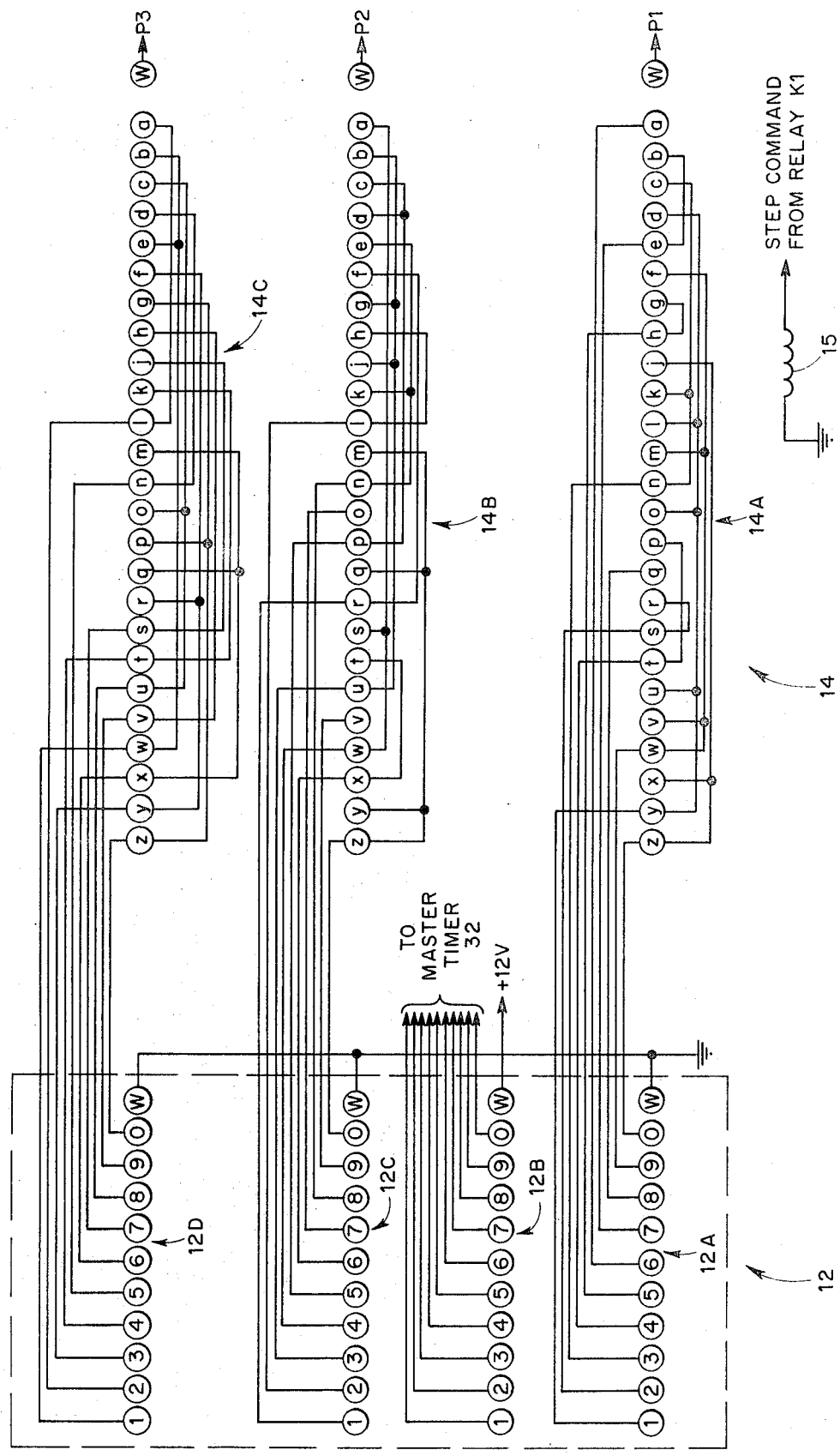
FIG. 2 is a circuit diagram showing, in more detail, the code switch and code select switch depicted in FIG. 1.

Prior to completing the discussion of the circuitry of FIG. 1, an actual embodiment of the code switch and code select switch is shown in the schematic circuit diagram of FIG. 2. The code switch 12 may be a commercially available thumb wheel switch having four separate switch banks with each bank having 10 positions associated therewith. The code select switch 14 may be a commercially available stepping switch.

The code switch 12 includes four separate switch banks 12A, 12B, 12C and 12D, and each switch bank includes a wiper contact W and 10 fixed contacts sequentially numbered 0–9. Switch banks 12A, 12C and 12D have their corresponding fixed contacts coupled, in a predetermined manner, to fixed contacts of switch banks 14A, 14B and 14C, respectively, associated with code select switch 14. The selected position of switch banks 12A, 12C and 12D provide the enabling code by way of code select switch 14 and code logic unit 16 to driver 18.

The fixed contacts of switch bank 12B couple to master timer 32, and a selected position of switch bank 12B controls the duration of the predetermined time interval of master timer 32. Timer 32 is shown in more detail hereafter with reference to FIG. 4.

As previously mentioned, the code select switch 14 may be a prewired stepping switch including three switch banks 14A, 14 B and 14C. Each of these switch banks includes a wiper contact W and, in the embodiment shown, 25 fixed contacts which are sequentially sensed and identified as contacts $a -h$ and $j -z$. The operation of the stepping switch of FIG. 2 is controlled by stepping switch coil 15 which has one side connected to ground and which receives a step command from relay K1 each time a proper code is entered by depressing operate switch 20 (see FIG. 1).

The output from stepping switch 14 taken at the wiper W of each of the switch banks 14A, 14B and 14C as referred to in FIG. 2 as the P1, P2 and P3 outputs, respectively. These P1-P3 outputs are coupled to the code logic unit 16 which is discussed in more detail hereinafter.

By way of example, it can be assumed that the coil 15 has been actuated previously and the stepping switch 14 is in position d. It can also be assumed that counter 90 (see FIG. 1) may have a corresponding count of 4. In operating the system, the authorized person conveys the count in counter 19 via telephone to a dispatcher at the central control terminal who in turn selects the proper associated code corresponding to position d of the stepping switch, namely code 155. The 155 code is entered into code switch 12 by the authorized operator by setting switch bank 12B to the 1 position, switch bank 12C to the 5 position, and switch bank 12D also to the 5 position. By having the interconnections shown in FIG. 2 of the stepping switch 14, a ground is applied by way of the wiper arm W of each of the switch banks 12A, 12C and 12D to the d fixed contact of each of the switch banks 14A, 14B and 14C and then by way of their associated wiper arms to output terminals P1, P2, and P3, respectively. If an improper code is entered, one of the output terminals P1, P2 or P3 does not have a ground signal thereat, and the code logic unit 16 is not enabled, as discussed in more detail hereinafter.

If the proper code has been entered and it is subsequently desired to enter a further code when the stepping switch has moved to position e for example, the counter 19 should have a count of 5 which count is conveyed to the central terminal and the predetermined code of 781 is the next proper code corresponding to the e position of stepping switch 14 which would enable a further operation of the system of FIG. 1.

Figure 3:
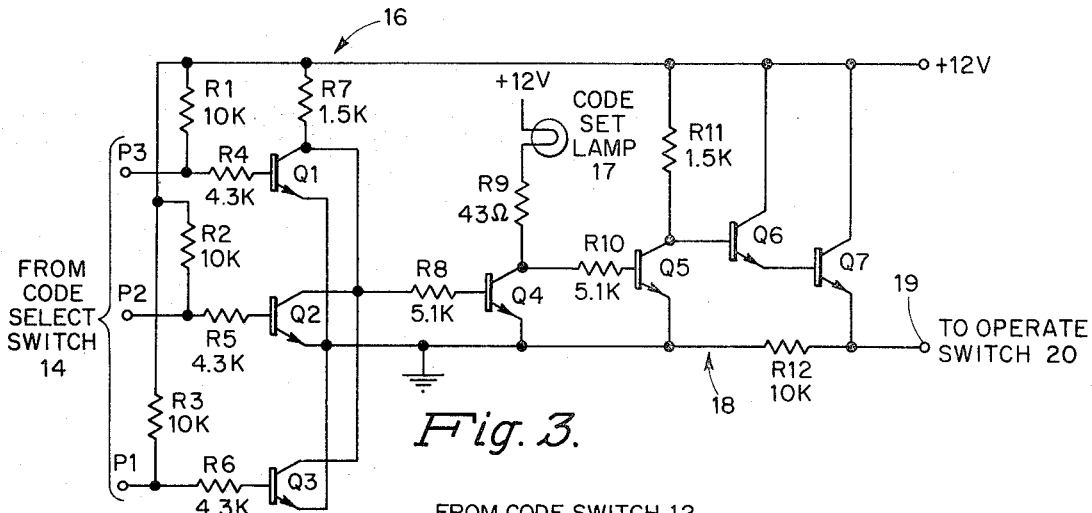
FIG. 3 shows a circuit diagram of one embodiment of the code logic unit and driver of FIG. 1.

Referring now to FIG. 3 there is shown a circuit diagram of one embodiment of a code logic unit and driver of FIG. 1. The circuit diagram of FIG. 3 shows the three circuit connections P1, P2 and P3 from code select switch 14 of FIG. 2, and shows an output connection 19 which couples to operate switch 20 shown in FIG. 1.

The code logic unit 16 generally comprises transistors Q1, Q2, Q3 and Q4, and the bases of transistors Q1, Q2 and Q3 couple by way of resistors R4, R5, and R6 to the P3, P2 and P1 input connections, respectively. Biasing resistors R1, R2 and R3 typically connect from the +12 volt supply to one side of resistors R4, R5 and R6, respectively. Resistor R7 couples from the +12 volt supply to the collectors of each of the transistors Q1, Q2 and Q3. The collectors of these transistors also connect by way of resistor R8 to the base of transistor Q4. The emitters of all of the transistors Q1, Q2, Q3, and Q4 connect to ground. The collector of transistor Q4 couples by way of resistor R9 to the code set lamp 17 which is illuminated when the proper code has been entered into the system as each of the input terminals P1-P3 are at ground potential.

Thus, with all of the input terminals at ground, transistors Q1, Q2 and Q3 are all non-conducting and a base current is provided by way of resistors R7 and R8 to the base of transistor Q4, rendering transistor Q4 conductive. This causes a current through resistor R9 which illuminates the set lamp 17 indicating that the proper code has been entered.

The driver 18 generally comprises transistors Q5, Q6 and Q7, and the base of transistor Q5 is coupled by way of resistor R10 to the collector of transistor Q4. The collector of transistor Q5 is coupled by way of resistor R11 to the +12 volt supply and the collectors of the other two transistors Q6 and Q7 also couple to the +12 volt supply. The emitter of transistor Q6 couples to the base of transistor Q7 and the emitter of transistor Q7 couples by way of the resistor R12 to ground and also to output terminal 19.

When transistor Q4 conducts transistor Q5 is held non-conductive and a base current is provided by way of resistor R11 to the base of transistor Q6 to turn on transistor Q6 and also transistor Q7. The output terminal 19, therefore, goes from an essentially ground potential to a positive 12 volt potential or thereabouts. This positive signal is coupled by way of operating switch 20, when it is depressed, to latch relay coil K1 of FIG. 1.

When an improper code has been entered one or more of the transistors Q1, Q2 and Q3 is conductive and transistor Q4 remains cut-off, not allowing illumination of set lamp 17. With transistor Q4 off, transistor Q5 is on and transistors Q6 and Q7 are off by virtue of the ground applied to the base of transistor Q6. Therefore the output terminal 19 remains at essentially ground potential and no enabling signal is provided to operate switch 20.

When the operate switch 20 is depressed after entry of a proper code, the positive output from driver 18 at terminal 19 is coupled by way of the normally open set of contacts 20A of switch 20 to one side of relay coil K1 the other side of which is grounded. Relay K1 is thus energized and its associated contact K1A provides a positive pulse by way of RC network 21 and set line 22 to both code select switch 14 and counter 19 thereby incrementing the code select switch 14 to its next position and counter 19 to its next count corresponding to the position of switch 14. Counter 19 may be of conventional design and includes means for viewing the count therein. Subsequently, when another code is to be entered into code switch 12 after the timing means has almost timed out, the next proper code corresponding to the new position of code select switch 14 must be entered into code switch 12 before another enabling signal is provided at the output of driver 18. As previously mentioned, the new code can be provided to the authorized operator who notes the count in counter 19, conveys this count to the dispatcher at the central terminal, and is provided with a new code to enter into code switch 12. The count in counter 19 and the code for code switch 12 are preferably, of course, not identical.

The other contact K1B of relay K1 applies a +12 volt signal to input line 32C of master timer 32 and a ground signal is provided on output line 32A to relay coil K2 to energize relay K2. When this occurs the associated contacts of relay K2, which number three, move from the de-energized position shown in FIG. 1 to the opposite position. The contact K2A couples a +12 volt signal to the warning timer 34 holding it charged, the contact K2B opens the circuit to flasher 36, and contact K2C removes the ground or discharge input 32B to master timer 32.

Figure 4:
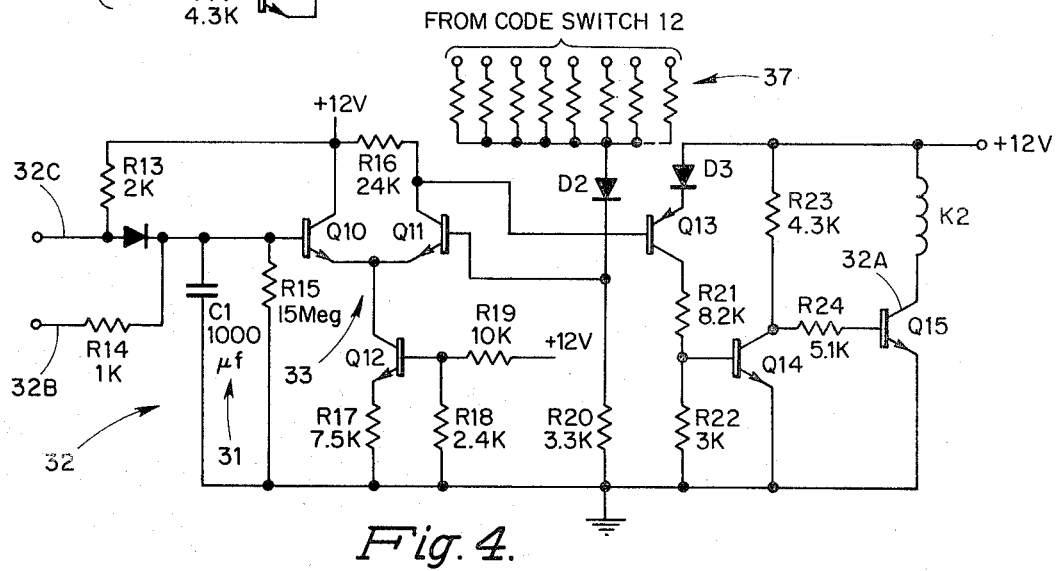
FIG. 4 shows a circuit diagram of one embodiment of the master timer of FIG. 1.

Referring now to FIG. 4 there is shown a circuit diagram of one embodiment of the master timer of FIG. 1, the detailed operation of which should assist in a further discussion of the system of FIG. 1.

The master timer 32 of FIG. 4 generally comprises an RC time constant network 31 including capacitor C1 and resistor R15, a differential amplifier 33 including transistors Q10, Q11, Q12, and output circuitry including transistors Q13, Q14 and Q15. The input to master timer 32 is at input line 32C which couples to the anode of diode D1. The discharge input to master timer 32 is coupled by way of a line 32B and resistor R14 to the cathode of diode D1. The master timer 32 of FIG. 4 also includes a resistor array 37 having preferably 10 inputs from the ten fixed contacts of switch bank 12B of code switch 12 shown in FIG. 2. The individual resistors of resistor array 37 are preferably of different predetermined values. The relay coil K2 shown in FIG. 4 couples from the +12 volt supply to the collector of transistor Q15 and is the same relay coil shown previously and discussed with reference to FIG. 1.

The RC network 31 includes capacitor C1 and resistor R15 which are coupled in parallel between ground and the base of transistor Q10. Resistor R13 couples from the +12 volt supply by way of diode D1 to the base of transistor Q10. The differential amplifier includes transistors Q10 and Q11 arranged in a conventional current switching pair and having a resistor R18 coupled between the +12 volt supply and the collector of transistor Q11. The collector of transistor Q10 also couples directly to the +12 volt supply. The emitters of transistors Q10 and Q11 couple by way of current source transistor Q12 and series resistor R17 to ground. The base of transistor Q12 biased by means of resistors R18 and R19 which couple in series between the +12 volt supply and ground.

The resistor array 37 couples by way of diode D2 to the base of transistor Q11, and the collector of transistor Q11 couples directly to the base of the output transistor Q13. Resistors R21 and R22 are connected in series between ground and the collector of transistor Q13 and the base of transistor Q14 couples intermediate resistors R21 and R22. The collector of transistor Q14 couples by way of resistor R23 to the +12 volt supply and by way of resistor R24 to the base of transistor Q15. The emitters of both transistors Q14 and Q15 are tied to ground. As previously mentioned, the relay coil K2 couples from the collector of transistor Q15 to the +12 volt supply.

In order to influence the time limit or time interval of the master timer 32 the switch bank 12B of FIG. 2 may be positioned to connect one of the resistors of resistor bank 37 from the +12 volts via the diode D2 to the base of transistor Q11.

When the operate button 20 is depressed and the timing means of the invention is enabled, the ground on input line 32C reverts to a positive level which enables a rapid charging of capacitor C1 via diode D1 to a fully charged initial voltage. In the operation of this system it is preferred that the operate switch 20 be depressed for about two seconds in order to enable a full charging of capacitor C1. When the operate switch is released relay K1 deenergizes and the ground signal is again applied to line 32C thereby back biasing diode D1. Capacitor C1 cannot discharge by way of resistor R14 as line 32B is open, and thus the only discharge is by way of resistor R15 and the high impedance represented by differential amplifier 33.

Initially, when capacitor C1 is fully charged, transistor Q10 is conducting and transistor Q11 is not conducting, and a biasing voltage is established by one of the resistors of the resistor array 37 and resistor R20 which form together a voltage divider determining a bias voltage for the base of transistor Q11. Under these conditions, with transistor Q11 off, transistor Q13 is also held off thereby providing no base current for transistor Q14 which also remains off. A base current is provided, however, by way of resistors R23 and R24 to the base of transistor Q14 turning transistor Q15 on and latching relay coil K2. Thus, essentially as soon as the operate button 20 is depressed, relay K2 is energized and the master timer 32 starts its timing interval.

When capacitor C1 has sufficiently discharged the voltage at the base of transistor Q10 becomes slightly more negative than the voltage at the base of transistor Q11 and transistor Q11 is rendered conductive. When this occurs the base of transistor Q13 goes negative and transistor Q13 turns on. The positive voltage developed across resistor R22, causes transistor Q14 to also conduct, and the base of transistor Q15 goes negative turning transistor Q15 off. When this occurs the relay coil K2 is deenergized, flasher 36 is enabled and the warning timer 34 has a +12 volt signal coupled thereto. In addition, the deenergization of relay K2 causes a ground to be applied to input line 32B which rapidly discharges capacitor C1.

When master timer 32 has timed out relay K2 deenergizes enabling flasher 36 via contact K2B and allowing warning timer 34 to start its timing cycle via contact K2A. The warning timer 34 and also emergency timer 40 may both be essentially identical to the master timer of FIG. 4 except that the resistor array 37 is replaced by a single resistor preselected for a desired warning or emergency time interval. In one embodiment the warning timer has a time interval of 2 minutes.

When relay K2 is energized (master timer timing) the timing capacitor of warning timer 24 is charged and relay K3 is energized just after relay K2 becomes energized. Thereafter, the input to the warning timer is grounded (master timer interval ended) and the warning timer starts its time-out interval. When relay K3 becomes energized its contact K3A causes illumination of the operate lamp 38 and causes the shutdown lamp 39 to extinguish. Operation of the K3B contact causes the +12 volts to be applied by way of its moveable contact and also the closed contact of relay K2B to flasher 36. Thus, flasher 36 is operable after the master timer 32 has timed out and the warning timer 34 is activated. The contact K3C associated with relay K3, when relay K3 is energized, applies the +12 volt level to one side of dual relay K5 and latches coil K5A which in turn automatically unlatches coil K5B because of the particular mechanical coupling of the two coils of dual relay K5. When coil K5A is energized and coil K5B deenergized a +12 volt signal is fed by way of contact K5B1 to the emergency timer 40 holding it in ready for use (timing capacitor charged).

The contact K3D associated with relay coil K3, upon being moved to its energized position, couples the +12 volts by way of its moveable contact to solenoid 42. With solenoid 42 in its energized position the means for impeding motion 60 is not activated and normal opertation of the vehicle is enabled. However, when the warning timer 34 times out relay coil K3 deenergizes and the +12 volts coupled by way of contact K3D is removed from the solenoid 42 allowing the solenoid to fall out and allowing an activation of the means for impeding motion 60. When coil K3 falls out power is also removed from coil K5A, power is removed by way of contact K3B from flasher 36, and operate lamp 38 is extinguished with shutdown lamp 39 being illuminated.

In an alternate embodiment the solenoid may be deenergized while relay coil K3 is latched. When coil K3 unlatches then the solenoid energizes to interrupt the fuel line of the vehicle, for example.

During the warning interval defined by warning timer 34 or even thereafter, it is possible for the operator to use the emergency mode of operation. As previously mentioned, when relay K3 is latched and relay coil K5B is deenergized a +12 volt signal is coupled via input line 40A to emergency timer 40, holding its timing capacitor charged and relay coil K4 energized. The associated contacts of relay coil K4 have thus moved from the position shown in FIG. 1 to their energized position. When this occurs contact K4A couples +12 volts to contact K5B2 associated with relay coil K5B. THe contact K4B associated with relay K4 couples the +12 volts to the moveable contact of the emergency switch 44. Upon movement of the emergency switch from the position shown in FIG. 1 to the upper position, the +12 volts is coupled by way of contact K4B to one side of relay coil K5B causing the K5B coil to latch and the K5A coil to automatically unlatch. When this occurs the +12 volts provided from contact K4A is coupled also by way of contact K5B2 to solenoid 42 latching the solenoid 42 and inhibiting the means for impeding motion 60. The emergency timer 40, however, eventually times out after a relatively short time of, for example, 2 minutes. Relay K4 deenergizes and solenoid 42 also deenergizes allowing the means for impeding motion 60 to be enabled. This stops further motion of the vehicle at that time. Once relay coil K5B latches the emergency timer cannot be recharged so it is possible to only use the emergency mode once for each code entry. If the emergency timer times out then the vehicle can only continue operating if a new proper code is entered thereby latching relay coil K3 and energizing solenoid 42.

It is also noted that flasher 36 has two other devices associated therewith, namely a warning lamp 46 and a sonic alert indicator 48. Flasher 36 may be of conventional design and may include, for example, a monostable or astable multivibrator.

FIG. 1 also shows a cancel switch 52 having a moveable contact coupled to the battery of the vehicle. In the position shown in FIG. 1, the cancel switch is inoperative and the battery is coupled to the +12 VDC terminal which delivers this voltage to the circuitry of FIG. 1. When it is desired to immediately inhibit motion of the vehicle the cancel switch is thrown to the other position, interrupting power to the circuitry and latching relay coil K5B. Interruption of the +12 VDC signal causes all relays to unlatch and inhibits operation of the emergency timer 40.

The means 60 shown in FIG. 1 may include the maxibrake system of a truck. When the solenoid 42 is energized the compressed air is not fed to the maxi-brake. However, when the solenoid deenergizes the air is fed and the maxi-brake locks. Means 60 may include various other types of conventional devices such as a solenoid operated switch for interrupting the ignition current of the vehicle.

Figure 5:
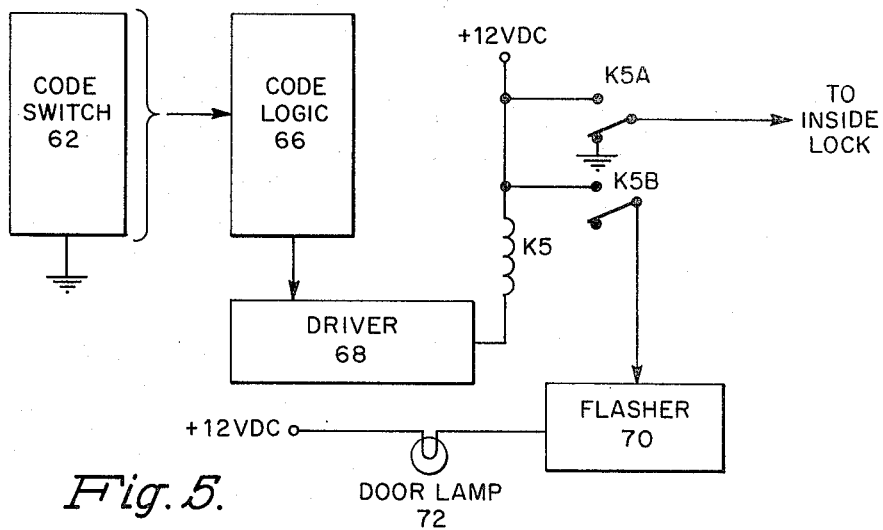
FIG. 5 shows primarily a block diagram of another embodiment of the present invention for operating an inside door lock in the storage compartment of the vehicle.

Referring now to FIG. 5 there is shown another embodiment of the present invention useful for unlocking an inside lock located in the storage compartment of the vehicle by entry of the proper code by the authorized operator into code switch 62. The code switch 62 may be identical to code switch 12 of FIGS. 1 and 2, may include three separate switch banks and may include three outputs coupled from a predetermined position of each switch bank to code logic unit 66. The embodiment of FIG. 5 may also include a code select stepping switch as shown in FIGS. 1 and 2. In the embodiment shown, when the proper code is set in switch 62 the three outputs to code logic unit 66 are all grounds thereby enabling unit 66.

The code logic unit 66 and driver 68 may be identical to unit 16 and driver 18 shown in FIGS. 1 and 3. Thus, the output of unit 66 enables driver 68 when the proper code is entered in switch 62, and the output of driver 68 latches relay coil K5. This action, in turn, couples the +12 volt signal via contact K5A to a solenoid (not shown) of the inside door lock thereby unlocking the door to the storage compartment. The latching of coil K5 also energizes flasher 70 by way of contact K5B. Flasher 70 may be identical to flasher 36 of FIG. 1, may include an astable multivibrator and has a door lamp 72 coupled thereto which flashes when the door solenoid is actuated.

Having described certain features of the present invention it should now become apparent that various modifications of and departures from the disclosed embodiment are contemplated as falling within the scope of the present invention. For example, relay circuitry has been disclosed but it is realized that logic circuitry such as integrated logic gates may be used in place thereof. All such modifications and others are contemplated as falling within the scope of the present invention as defined by the following claims.

What is claimed is:

1. A system for preventing the theft of a vehicle comprising;

means for receiving at least one code at a time of a plurality of different preselected codes, timer means including means for establishing a predetermined time interval of the timer means, said timer means being responsive to receipt of a proper code for commencing said predetermined time interval, and means responsive to termination of the predetermined time interval for inhibiting the movement of the vehicle, whereby receipt of a second proper code prior to the termination of the predetermined time interval permits further movement of the vehicle.

2. The system of claim 1 wherein said timer means includes a master timer defining a first time period.

3. The system of claim 2 comprising a warning timer responsive to termination of the first time period and including means establishing a second time period.

4. The system of claim 3 wherein said second time period is shorter than said first time period.

5. The system of claim 2 including means for varying the first time period.

6. The system of claim 3 further comprising an emergency switch and an emergency timer coupled from said warning timer and responsive to the termination of the second time period and operation of the emergency switch and including means defining a third time period.

7. The system of claim 6 wherein said second and third time periods are of comparable duration.

8. The system of claim 3 comprising a flasher coupled to said warning timer and operable during said second time period.

* * * * *